3,511,688
METHOD FOR ADHESIVELY SECURING A RESINOUS MATERIAL TO A POROUS SUBSTRATE
Marion O. Brunson, Kingsport, Tenn., assignor to Eastman Kodak Company, Rochester, N.Y., a corporation of New Jersey
No Drawing. Filed Mar. 4, 1966, Ser. No. 531,774
Int. Cl. B65b 31/02; B44d 1/14
U.S. Cl. 117—67                    5 Claims

ABSTRACT OF THE DISCLOSURE

A method for adhesively securing a resinous material to a porous substrate including the steps of spraying the substrate with an adhesive resin dissolved in a volatile liquid carrier, evaporating the volatile carrier to leave a porous layer of the resin.

---

This invention relates in general to the packages produced and to the formation of paperboard substrates suitable for vacuum skin packaging and in particular to the priming of paperboard to obtain increased adhesion between the substrate and a resinous coating or skin comprising a polyolefin coating or the like.

In the past, adhesion between a substrate and a polyolefin coating has generally required heat and pressure, or the presence of modifying chemicals in the polyolefin composition, unless an adhesive primer is employed. Where a primer type adhesive layer has been employed it has generally provided a continuous layer which is then perforated or a noncontinuous layer can be employed as disclosed in U.S. 2,855,735 patented on Oct. 14, 1958.

Vacuum skin packaging often necessitates the use of a primer to obtain proper adhesion between the packaging film and the substrate. However, since a vacuum must be drawn through the substrate, a requisite degree of substrate porosity must be provided. The aforesaid U.S. Pat. 2,855,735 covers a process whereby the substrate is primed with a suitable adhesive as a noncontinuous primer coating. However, it is quite undesirable in many packaging situations to be restricted to such coatings.

It has now been found that especially in the case of certain curtain coating processes, the porosity inherent in the paperboard substrate can be preserved even though the surface to be coated has been spray primed over at least all of the surface not intended to support an article to be vacuum skin packaged.

Accordingly, it is an object of this invention to provide a method of increasing the adhesion between a polyolefin coating composition and a porous paperboard substrate wherein the inherent porosity of the substrate is not substantially impaired.

It is still another object of the present invention to provide a primed packaging substrate, suitably adherent for polyolefin vacuum skin packaging operations, which does not exhibit visible perforations.

A further object is to provide a printed substrate which is also primed and yet retains the above-mentioned advantages.

Another object is to provide an improved skin packaged article having an adherent polyolefin skin coating.

Additional objects and advantages, though not specifically disclosed herein, will be readily apparent to one skilled in the art when his knowledge is taken in conjunction with the following description.

According to one embodiment of the present invention, a suitably porous paperboard substrate, which is advantageously subjected to a porosity retentive printing operation, is sprayed with a primer composition consisting of an adhesion promoting resin and a rapidly drying solvent whereby a porous layer of the primer resin is coated upon the substrate.

According to a preferred embodiment of this invention there is provided a method for priming a porous paperboard substrate to obtain increased adhesion to a superposed polyolefin layer whereby the porosity of the primed substrate is substantially unimpaired, said method comprising spray coating the surface of porous paperboard with a porosity retentive adhesive resin dissolved in a volatile liqud carrier and substantially simultaneously evaporating the liquid carrier to leave a porous layer of the resin.

According to another embodiment of this invention, this method includes the step in which a hot melt of a polyolefin is applied by curtain coating means to the porous layer of resin.

According to a further embodiment, the method of the invention includes the step in which porous paperboard is initially printed with a permeable layer of lithographic ink followed by said spray coating of the surface of the printed porous paperboard with a porous layer of resin.

Another advantageous embodiment of this invention provides a resin coated paperboard substrate as described above and a skin packaged article supported on such a substrate coated with a solidified layer of a molten polyolefiin.

The resins which are preferred in the practice of the instant invention include the following preferred catagories: resinous polyterpenes, resinous cracked petroleum hydrocarbon resins, resinous chlorinated biphenyls, resinous hydrogenated rosins, and resinous esters of wood rosins. The polyterpenes can advantageously be prepared by the polymerization of either alpha or beta pinene and include Piccolyte resins, Nirez resins or the like. Hydrocarbon resins can advantageously be prepared from the polymerization of unsaturated hydrocarbons derived from the deep cracking of petroleum and include Picopale resins or the like. Chlorinated bisphenolic resins are also known as chlorinated biphenyls such as the Arochlor resins. Partially hydrogenated rosins and wood rosin esters are well known commercial products of a resinous nature such as Stabelite resins or the like.

The composition may be a solution of resin and a low-boiling organic solvent. Advantageously a volatile solvent is used which is preferably a chlorinated solvent to reduce or eliminate the fire hazard.

In a preferred embodiment of this invention the resin concentration is within the range between 5 and 15 percent by weight of the total primer composition weight, since the porous primer coatings have been found to be most readily obtained in this range.

After the solvent is evaporated, the substrate is ready for application of thermoplastic polyolefin film, either as a curtain coating or a pre-extruded film.

According to one embodiment of the present invention, multiple coatings can be employed to provide still greater adhesion; even with multiple coatings substrate porosity is not unduly impaired, and the substrates so treated with two or more coatings are especially receptive to a thermoplastic, polyolefin film brought into intimate contact therewith by Chenoweth U.S. application Ser. No. 259,707 filed Feb. 19, 1963, now Pat. No. 3,299,195 issued Jan. 17, 1967, or the more tradiational skin packaging process illustrated in the above-mentioned U.S. 2,855,735.

This invention can be further illustrated by the following examples of preferred embodiments although it will be understood that these examples are included merely for purposes of illustration and are not intended to limit the scope of the invention unless otherwise specifically indicated.

As used in the specification and claims, statements to the effect that the superposed polyolefin layer is drawn into firm contact with the coated substrate obviously include skin packaging where the polyolefin layer is held away from the substrate in the immediate area of the article being packaged.

EXAMPLE 1

Panels of paperboard identified as 18-point chipboard were sprayed with a standard spray gun using a 12% solution of Nirez No. 1100 polyterpene resin dissolved in hexane. The spray gun used was a DeVilbiss type MBC spray gun manufacture by DeVilbiss Company of Toledo, Ohio. The application of one, two and three coats of primer did not adversely affect the porosity of the board as shown by measuring the porosity on the Gurley porosity tester with the following results:

| Coats of primer: | Porosity |
|---|---|
| None | 39 sec./50 cc. air. |
| 1 | 35 sec./50 cc. air. |
| 2 | 35 sec./50 cc. air. |
| 3 | 35 sec./50 cc. air. |

The panels so prepared were used as packaging substrates in a curtain coating packaging process as disclosed above and it was shown that adhesion of the polyolefin, in this case a copolymer of propylene and 1-butene (65% by weight propylene, 35% butylene, mol. wt. about 22,000), was directly proportional to the number of coats of primer applied. This polyolefin copolymer is described in U.S. 3,106,485; see also the description in Coover et al. Ser. No. 265,095, now abandoned, and continuation-in-part Ser. No. 570,929 filed Aug. 8, 1966. In this case no adhesion was obtained with uncoated board, whereas sufficient adhesion to lead to fiber tearing upon stripping was obtained with board coated with two and three coats of primer. The curtain coating was performed as described in the above-mentioned Chenoweth et al. patent application and in an article in Modern Packaging, May, 1965, entitled "Skin Pack that Flows On." The polyolefin resins are described in U.S. 3,106,485.

The Gurley porosity tests set forth herein are based upon TAPPI Method T 460 m-49, i.e., ASTM Method D726–58.

EXAMPLE 2

Panels of paperboard identified as 18-point solid bleached sulfate were treated as in Example 1 and checked for porosity. The Gurley tester indicated no significant change in porosity with up to three coats of primer as follows:

| Coats of primer | Gurley porosity |
|---|---|
| None | 210 sec./25 cc. air. |
| 1 | 240 sec./25 cc. air. |
| 2 | 240 sec./25 cc. air. |
| 3 | 210 sec./25 cc. air. |
| None | 210 sec./25 cc. air. |

The 18-point solid bleached sulfate board so prepared was used as a packaging substrate as in Example 1 and again the adhesion was shown to be directly proportional to the amount of primer applied. It was observed that the vacuum drawdown of the polyolefin film applied from the curtain coater was not significantly affected when comparing the primed board with the unprimed board.

The amount of sprayed resin applied during each coating is advantageously limited to no more than will permit immediate evaporation of the solvent or liquid carrier, i.e., hexane or other equivalent hydrocarbon solvent including chlorine substituted hydrocarbons, etc.

The above examples can be carried out with similar results using other porosity retentive adhesive resins of the group defined above including various obvious equivalent resins.

Although advantageous results can be obtained in practicing this invention as described herein, it is to be noted that other resinous coating materials which might appear to be useful primer resins are not satifactory since they block porosity, e.g., lacquers and other coating materials of equivalent nature.

The substrate can be advantageously printed as described in copending Dittmar U.S. patent application Ser. No. 626,417 filed on Mar. 28, 1967. The printing inks and printing process described by Dittmar do not have anl substantial adverse affect upon the porosity of the substrate. It is therefore a further advantage of this invention that a porous substrate can be printed with a permeable lithographed layer of ink and then with a permeable primer as described above. The resulting coated substrate having two or more superposed layers has greatly improved value in vacuum skin packaging operations. Two or more sprayed coatings of primer are especially advantageously employed.

Although the invention has been described in considerable detail with reference to certain preferred embodiments thereof, it will be understood that variations and modifications can be effected without departing from the spirit and scope of the invention as described hereinabove and as defined in the appended claims.

The embodiments of the invention in which an exclusive property or privilege is claimed are defined as follows:

1. The method of firmly securing a polyolefin layer to a porous paperboard substrate comprising the steps of
   (a) spray coating the surface of the said porous paperboard with a porosity retentive adhesive resin dissolved in a volatile liquid carrier, the concentration of said resin being within the range of about 5% to about 15% of the total weight of resin and liquid carrier,
   (b) substantially simultaneously evaporating the liquid carrier as it is applied to said substrate to leave a porous layer of the resin, said adhesive resin being a resinous polyterpene, a resinous cracked petroleum hydrocarbon resin, a resinous chlorinated biphenyl, a resinous hydrogenated rosin or a resinous ester of wood rosin, and
   (c) superposing a heated polyolefin layer over said substrate and subjecting the uncoated side of said substrate to a vacuum which is transmitter through both said substrates and said porous coating to draw the polyolefin layer firmly into contact with said coated substrate to cause said layer to adhere thereto.

2. The method according to claim 1 in which said liquid carrier is a low boiling organic solvent.

3. The method according to claim 1 in which the porous layer of resin comprises from 2 to about 6 successively sprayed coatings.

4. The method according to claim 1 in which the polyolefin is applied by curtain coating a hot melt on said porous layer of resin.

5. The method according to claim 1 in which said polyolefin is a copolymer of propylene and 1-butene.

(References on following page)

References Cited

UNITED STATES PATENTS

| | | | |
|---|---|---|---|
| 2,855,735 | 10/1958 | Groth | 53—30 X |
| 3,232,895 | 2/1966 | Klein et al. | 117—158 X |
| 3,256,228 | 6/1966 | Tyran | 117—155 X |
| 3,299,195 | 1/1967 | Chenoweth et al. | 53—140 X |
| 2,348,594 | 5/1944 | Bernardi | 106—29 |
| 2,375,660 | 5/1945 | Jones | 106—29 X |
| 2,503,772 | 4/1950 | Rust | 106—290 X |
| 3,193,449 | 7/1965 | Aldrich et al. | 162—168 |
| 3,287,206 | 11/1966 | Aldrich et al. | 162—168 |
| 3,375,130 | 3/1968 | Kincannon | 117—155 X |

FOREIGN PATENTS

| | | |
|---|---|---|
| 784,503 | 10/1957 | Great Britain. |
| 840,949 | 7/1960 | Great Britain. |
| 908,269 | 10/1962 | Great Britain. |
| 963,377 | 7/1964 | Great Britain. |
| 975,902 | 11/1964 | Great Britain. |

OTHER REFERENCES

Ruyyer, John De.: "Skin Packaging," Modern Packaging, May, 1965, p. 294.

WILLIAM D. MARTIN, Primary Examiner

M. R. LUSIGNAN, Assistant Examiner

U.S. Cl. X.R.

117—76, 104, 105.3, 119, 155, 158; 53—22; 264—238

PO-1050
(5/69)

UNITED STATES PATENT OFFICE
CERTIFICATE OF CORRECTION

Patent No. 3,511,688            Dated May 12, 1970

Inventor(s) Marion O. Brunson

It is certified that error appears in the above-identified patent and that said Letters Patent are hereby corrected as shown below:

Column 2, line 17, delete "liqud" and insert in place thereof ---liquid---.

Column 3, line 3, after "therewith" insert---by vacuum means using the curtain coating process illustrated---.

Column 3, line 70, in the table, delete "None----210 sec./25 cc. air." in the second occurrence.

Column 4, line 24, delete "anl" and insert in place thereof---any---.

Column 4, line 60, delete "transmitter" and insert in place thereof---transmitted---.

SIGNED AND
SEALED
OCT 20 1970

(SEAL)
Attest:

Edward M. Fletcher, Jr.
Attesting Officer

WILLIAM E. SCHUYLER, JR.
Commissioner of Patents